Patented Feb. 17, 1925.

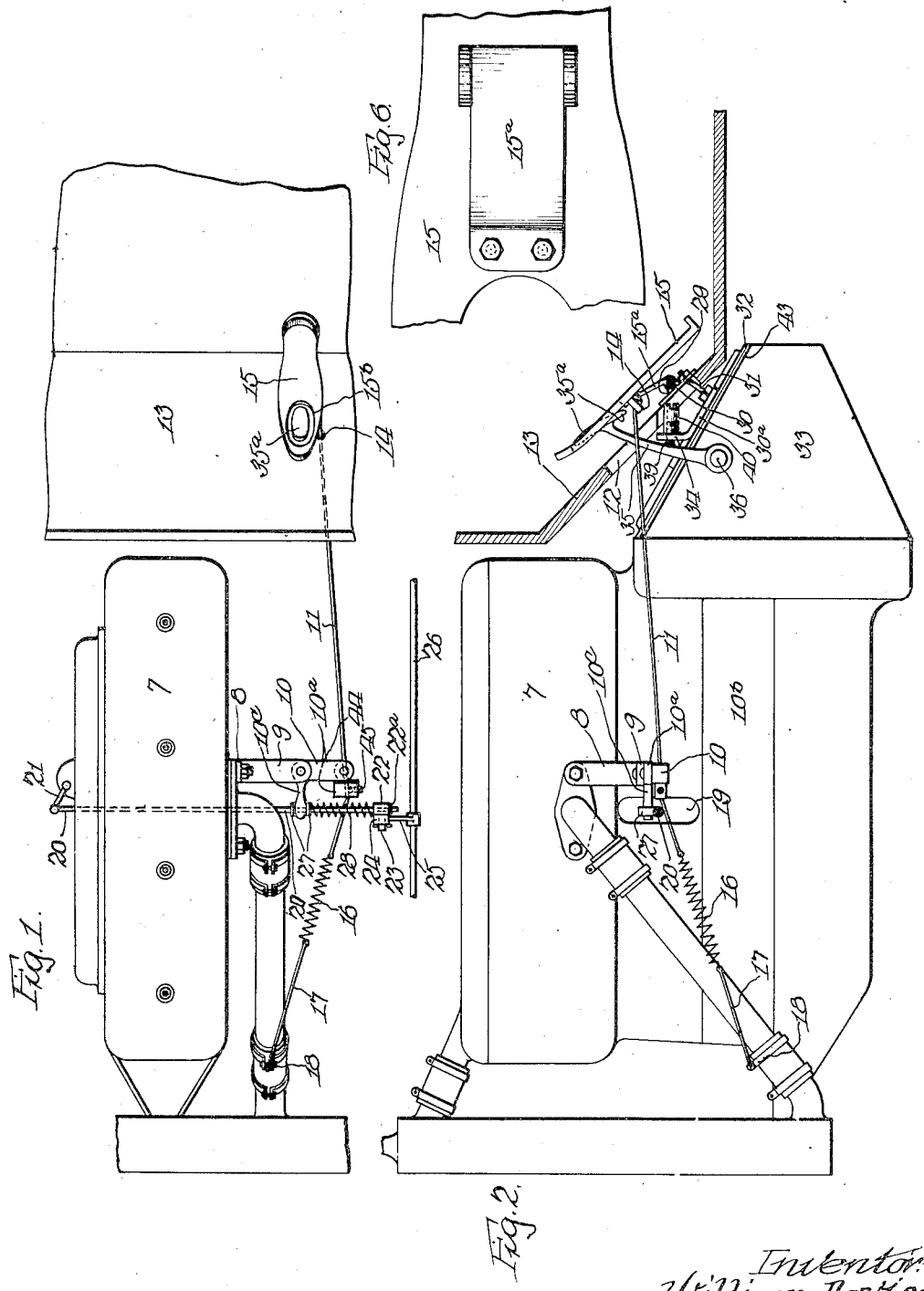

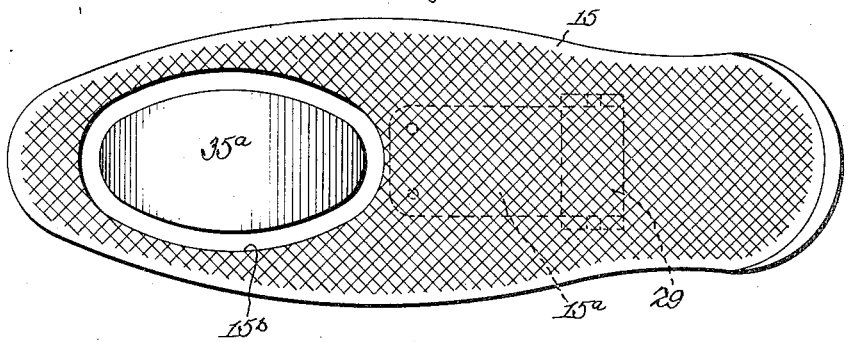
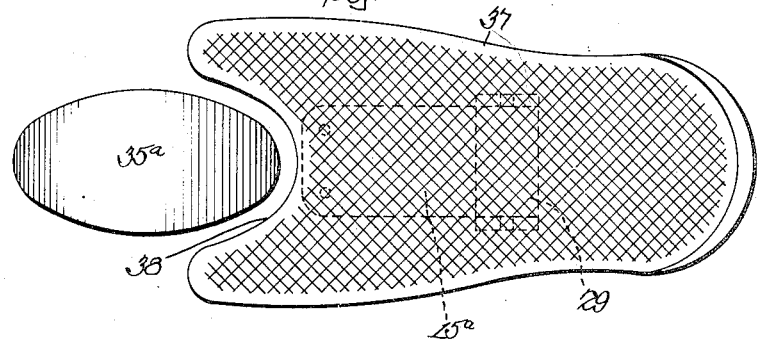
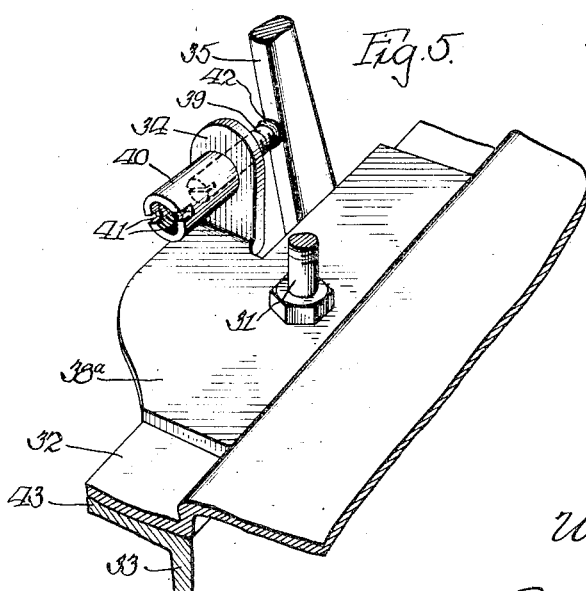

1,527,152

UNITED STATES PATENT OFFICE.

WILLIAM DAVIS, OF CHICAGO, ILLINOIS.

DUAL CONTROLLING DEVICE FOR MOTOR VEHICLES.

Application filed June 21, 1924. Serial No. 721,461.

*To all whom it may concern:*

Be it known that I, WILLIAM DAVIS, a citizen of the United States, residing at Chicago, in the county of Cook and State of Illinois, have invented certain new and useful Improvements in a Dual Controlling Device for Motor Vehicles, of which the following is a specification.

My present invention relates to controlling mechanisms for motor driven vehicles, and while it is particularly designed and intended for use in connection with the Ford type of automobiles or motor vehicles, yet it is not limited thereto in its application or use.

Briefly stated, the invention consists in certain peculiarities of the construction, novel arrangement and combination of the various parts of device, hereinafter described, which can be easily applied to a vehicle, particularly one of the Ford type, without any material alteration in the standard equipment thereof, which is capable of simple, accurate and prompt operation and control for interrupting or controlling the supply of motive power to a driven member of the vehicle, and applying the brakes thereof.

An important object of the invention is to provide a foot operated mechanism for the control of the accelerator of a motor driven vehicle of the Ford type so associated with the brake lever of such a type of vehicles as to enable the accelerator or said lever to be operated by one foot of the chauffeur or driver without removing his foot from the pedal used for operating the accelerator.

Another object of the invention is to provide means of the above mentioned character wherein the accelerator operating pedal thereof will be so constructed, mounted and arranged with respect to the upper end of the brake lever that the whole weight of the foot can be supported by said pedal, yet in such a way that the brake lever shall be exposed to the action of the foot for application of the brakes of the vehicle.

Other objects and advantages of the invention will be disclosed in the following description and explanation, which will be more readily understood when read in conjunction with the accompanying drawing, in which an embodiment of which the invention is susceptible is illustrated, it being understood that changes and modifications may be resorted to without departing from the spirit of the invention, so long as they come within the scope of the appended claims forming a part hereof.

In the drawings,—

Fig. 1 is a plan view of a fragment of the floor of an automobile and an internal combustion engine of the Ford type, equipped with a controlling device embodying the invention.

Fig. 2 is a side view partly in section of like parts.

Fig. 3 is a greatly enlarged plan view of the brake lever pedal and accelerator operating pedal illustrating them in their normal positions.

Fig. 4 is a similar view of like parts showing a modification in the construction of the accelerator operating pedal.

Fig. 5 is a perspective view of a portion of the gear case of the vehicle showing a means mounted thereon for supporting the accelerator operating pedal and for adjusting the brake lever, which parts are shown in side elevation in Fig. 2, and Fig. 6 is a bottom plan view of a portion of the accelerator pedal.

Like numerals of reference refer to corresponding parts throughout the different views of the drawing.

Referring now more particularly to Figs. 1 and 2 of the drawings, the reference numeral 7 designates as a whole the motor of a Ford vehicle or automobile, which may be mounted on the frame of the vehicle in the ordinary or well known way. On one of its sides the motor 7 has secured thereto one arm 8 of an angle bracket the other arm 9 of which is extended horizontally from the side of the motor as will be readily understood by reference to Figs. 1 and 2. Pivotally mounted on the arm 9 of said bracket at or near its free end is a bell crank lever 10 one arm $10^a$ of which has transversely and horizontally extended through a block $10^b$ swiveled on said arm, a wire 11, which wire also extends through a suitable opening 12 in the foot board 13 of the vehicle body and is attached at its rear end preferably by means of a lug 14 provided on the forward part of a pedal 15 used for operating the accelerator of the vehicle. The wire 11 is extended in substantial parallelism with the adjacent side of the motor 7 and has connected to its front end one end of a spring 16 the other end of which spring is connected by means of a wire 17 to an ordinary hose clamp 18 in any well known way.

Extended through a suitable opening 19 in the motor casing is a horizontally disposed rod 20 which is pivotally secured at one of its ends to the throttle arm 21 and is extended at its other end through a member or block 22 carried by a pin 23 mounted on an enlargement or a block 24 carried by a bracket 25 on the ordinary upright hand operated throttle rod 26 of a vehicle of the Ford type. The rod 20 has mounted thereon near the arm 10ª of the bell crank lever designated as a whole by the numeral 10, a pair of spaced lugs or collars 27 between which the other arm 10ᶜ of the lever 10 is interposed so that in the movement of the arms of the bell crank lever 10 in one direction the rod 20 will be operated so as to slide through the block 22 slightly in such a way as to operate the throttle or valve of the accelerator.

Interposed between the block 22 and the collar 27 adjacent the same is a spring 28 which is coiled around the rod 20 and employed to retract it when pressure is removed from the bell crank lever 10 of the device.

As shown in Figs. 2, 5 and 6 of the drawings, the pedal 15 has on its lower surface a rearwardly and downwardly extended arm 15ª, which is preferably somewhat resilient and is pivotally mounted on a short standard 29 carried by a plate 30 which is secured by means of a single bolt 31 to the upper surface of the foot board 13 over the opening 12 therein in such a way as to prevent said plate turning. The bolt 31 also serves to secure a plate 30ª to the cover 32 of the transmission gear case 33 of a Ford vehicle. The plate 30ª has an upturned member or bracket 34 located at one side of the standard 29 and bolt 31, with its edges presented transversely with respect to the body of the vehicle and located near but rearwardly of the brake lever 35, which lever is mounted on a shaft 36 extended through the casing 33 and used for operating the brake mechanism of the vehicle in the well known way. This lever 35 is provided at its upper end with an enlargement or foot rest 35ª which is adapted for exposure to the action of the foot of the operator of the vehicle through an opening 15ᵇ in the forward part of the accelerator operating pedal 15 of the device, that is, when the construction of such pedal shown in Fig. 3 of the drawing is employed.

Instead of providing the forward part of the accelerator pedal with an elongated opening 15ᵇ as shown in Fig. 3, a modified form 37, of the accelerator pedal may be used in which the foot rest or pedal 37 terminates a slight distance rearwardly of the transverse middle of the head or foot rest 35ª of the brake lever and is formed with a rearwardly extended recess 38 to permit of free independent action of the pedal 37 or the brake lever and its head. The upright 34 on the plate 30ª is provided with an opening through which is extended in threaded engagement therewith a screw 39 the front end of which is adapted to contact with the adjacent surface of the lever 35 as is clearly shown in Figs. 2 and 5 of the drawings.

The rear end of the screw 39 is slotted for the reception of a screw driver and has threaded thereon a sleeve 40 having slots 41 for the reception of the blade of a screw driver used for tightening up the sleeve 40 after the screw has been adjusted so as to give the proper position to the brake lever 35, thus acting as a nut lock for said screw, That end of the screw adjacent the lever 35 is provided with slipping means to engage the said lever as at 42 so as to prevent the screw turning when the nut lock or sleeve 40 is adjusted thereon.

By reference to Fig. 5 of the drawings it will be seen that the plate 30ª is so mounted on the cover 32 of the gear case 35 that one of its edges will rest against a shoulder 43 of the cover, thus preventing the plate 30ª turning and requiring a single bolt 31 only to securely fasten it in position.

From the foregoing and by reference to the drawing it will be readily understood and clearly seen that by my improvements a foot rest comprising the pedal 15 and the head or rest 35ª of the brake lever is provided in such a manner that the whole weight of the foot may be comfortably supported thereby yet in such a way that either the pedal 15 or the lever 35 can be operated as desired.

It will be further understood that as the rod 20 is extended through a suitable opening in the block or member 22, which member is carried by the bracket 25 of the hand operated throttle rod which is associated with the steering post in the usual manner, and is slidably mounted in said block or member, either the hand operated throttle rod 26 or the pedal 15 can be used for operating the accelerator. In order to prevent the rod 20 being accidentally withdrawn from the member 22, a cotter pin 22ª is extended through an opening in the rod 20 between the member 22 and the throttle rod 26 as will be seen in Fig. 1 of the drawings. The connection or wire 11 has mounted thereon in front of the arm 10ª of the bell crank lever 10 a stop member 44 which can be adjusted on the wire and fixed thereto by means of a set screw 45 seated in said member and adapted for engagement with the wire.

An important feature of the invention consists in the arrangement of the various parts of the device whereby they can be installed in connection with a motor vehicle of the Ford type without any material alteration in any of the usually employed parts thereof, for carrying out the functions of operating the accelerator and manipulating the brakes, for it will be understood that the plate 30ᵃ carrying on its bolt 31 the plate 30 having the standard 29, the upright 34 and adjusting screw 39, can be readily and securely fixed on the transmission gear case 33 by employment of a single bolt 31 in such a manner that the plate 30ᵃ cannot turn and so that the bolt 31 may register with and enter the opening 12 in the foot board of the body of the vehicle in which the brake lever 35 operates so that the arm 15ᵃ of the accelerator operating lever 15 can be pivotally mounted on the standard 29, of the plate 30, after which the connections between the pedal 15 and throttle valve can be placed in position as above set forth.

By means of the adjusting screw 39 which cooperates with the brake lever 35, it is manifest that by turning said screw in the proper direction, said lever can be positioned with respect to the pedal 15 in such a way that its enlargement 35ᵃ may be located so as to protrude slightly above the surface of the pedal 15 or if desired, may be located a slight distance below the lower surface of said pedal or flush therewith.

By providing the accelerator operating pedal 15 with a downwardly and rearwardly extended arm, which arm as before stated, may be slightly resilient, and pivoting it at its free end to a suitable support located rearwardly of the longitudinal middle of said pedal, it is manifest that a very comfortable foot rest will be provided for the foot of the operator, and one in which, especially when the arm 15ᵃ is made of resilient material, will afford a bodily yielding movement of the pedal, thus permitting much pressure or stress to be applied to the foot rest 35ᵃ of the brake actuating pedal, and at the same time providing means for the actuation of the accelerator by a very slight movement downwardly of the heel portion of the pedal.

Having thus fully described my invention, what I claim as new and desire to obtain by Letters Patent is:

1. In a device of the class described, the combination with a brake actuating lever, of a motor, an accelerator and its valve, a pedal having on its lower surface a downwardly and rearwardly disposed resilient arm rigidly secured at one of its ends to said pedal between the ends thereof, said arm being pivotally mounted at its other end near said lever, and means operatively uniting said pedal to said valve of the accelerator.

2. In a device of the class described, the combination with a brake actuating lever, of a motor, an accelerator and its valve, a pedal, a bell crank lever supported at one side of the motor, a connection attached at one of its ends to said pedal and slidably united to one of the arms of the bell crank lever, a stop member on said connection for co-action with said arm, and a spring actuated rod uniting the other arm of the bell crank lever and the valve of the accelerator.

3. In a device of the class described, the combination with a brake actuating lever of a motor, an accelerator and its valve, a pedal, a bell crank lever supported at one side of the motor, a spring-actuated connection attached at one of its ends to said pedal and slidably united to one of the arms of the bell crank lever, a stop member on said connection for co-action with said arm, and a spring-actuated rod uniting the other arm of the bell crank lever and the valve of the accelerator.

4. A device of the class described including an elongated pedal having on its lower surface a downwardly and rearwardly disposed resilient arm rigidly secured at one of its ends to said pedal between the ends thereof, said arm being pivotally mounted at its free end, and a connection operatively uniting said pedal to a part to be operated thereby upon its movement in one direction.

5. In a device of the class described, the combination with a brake actuating lever, of a motor, an accelerator and its valve, a pedal having on its lower surface a downwardly and rearwardly disposed arm rigidly secured at one of its ends to said pedal between the ends thereof, said arm being pivotally mounted at its other end near said lever, and means operatively uniting said pedal to said valve of the accelerator, said pedal associated with the upper end of said brake actuating lever so as to permit exposure of said end to the foot of the operator while on said pedal.

6. In a dual controlling device for motor vehicles of the Ford type, the combination with the apertured foot board of the vehicle body, of a transmission gear case mounted thereunder and having on its cover a transversely disposed shoulder, a brake actuating lever mounted on said case and extended upwardly through said opening of the foot board, a plate mounted on said cover, with an edge thereof contacting with said shoulder, a screw-bolt vertically seated in the said plate and engaging with its lower end said cover, said bolt being extended through said opening, an upright standard-carrying plate detachably mounted on the upper end of said bolt and secured thereby to the upper surface of said foot-board, an elongated pedal having on its lower surface a downwardly and rearwardly disposed arm rigidly secured at one of its ends to said pedal between the ends thereof and pivotally mounted at its other end on said standard, means operatively uniting said pedal to a part to be operated thereby upon its movement in one direction, said pedal associated with the upper end of said lever so as to permit exposure of said end to the foot while on said pedal.

7. In a duel controlling device for motor vehicles of the Ford type, the combination with the apertured foot-board of the vehicle body, of a transmission gear case mounted thereunder and having on its cover a transversely disposed shoulder, a brake actuating lever mounted on said case and extended upwardly through said opening of the foot-board, a plate mounted on said cover with an edge thereof contacting with said shoulder and having an upright bracket located rearwardly and in the path of said brake actuating lever, means adjustably mounted on said bracket and engaging said lever to restrict its movement in one direction, a screw-bolt vertically seated in the said plate and engaging with its lower end said cover, said bolt being extended through said opening, an upright standard-carrying plate detachably mounted on the upper end of said bolt and secured thereby to the upper surface of said foot-board, an elongated pedal having on its lower surface a downwardly and rearwardly disposed arm rigidly secured at one of its ends to said pedal between the ends thereof and pivotally mounted at its other end on said standard, means operatively uniting said pedal to a part to be operated thereby upon its movement in one direction, said pedal associated with the upper end of said lever so as to permit exposure of said end to the foot while on said pedal.

WILLIAM DAVIS.